United States Patent Office 3,371,015
Patented Feb. 27, 1968

3,371,015
PHARMACEUTICAL CORE COMPOSITIONS WITH THIN RAPIDLY DISINTEGRATING COATINGS
John Albert Sjogren, Molnlycke, and Rolf Gustav Harry Persson, Molndal, Sweden, assignors to Aktiebolaget Hässle, Apotekare Paul Nordströms Fabriker, Goteborg, Sweden, a Swedish body corporate
No Drawing. Filed June 27, 1963, Ser. No. 290,936
Claims priority, application Sweden, June 28, 1962, 7,189/62
12 Claims. (Cl. 167—82)

The present invention relates to coatings for pharmaceutical compositions, e.g. tablets.

Coatings for pharmaceutical compositions such as tablets, granulates, suppositories (whether rectal or vaginal) and the like have been known for a long time. Their purpose is to protect the composition against chemical and mechanical action during transport and storage. One of the more important purposes of the coating is also to conceal the taste of any disagreeably tasting component embodied in the composition or to give an agreeable taste to the coated object. Another important function of the coating is to give the coated object an attracive appearance. Besides this it is often desirable to avoid the presence of water during the application of the coating since the water may damage moisture-sensitive compounds in the composition or lead to discolouration of the coating material. The most common method of coating pharmaceutical compositions is sugar coating according to which the objects to be coated, hereinafter termed "cores," are moistened with an aqueous solution of sugar and tumbled in a rotating pan. The moistened cores are then dried by adding different powder mixtures and blowing air on them. This method of coating requires great skill in order to give good results and is also particularly time-consuming since the moistening and drying-operations must be repeated many times before a smooth surface is obtained and the coating has reached a thickness such that a satisfactory protection of the core has been obtained and its edges are well covered. As a rule several days' treatment is required to produce a satisfactory coating. Another disadvantage with this method of coating is that a certain amount of water always remains in the coating and destroys any moisture-sensitive compounds which may be present in the cores. In pharmaceutical tables, for instance, containing moisture-sensitive substances, such as ferrous compounds, vitamins and the like, this is a serious problem which leads to the weakening or disappearance of the therapeutical effect of the active substances or to the discolouration of the tablets. Furthermore such coatings have a long time of dissolution and the disintegration time of the coated core is thus prolonged. For this reason other coating methods must be resorted to in cases when a rapid disintegration in the stomach of the coated composition is desired.

In order to avoid the disadvantages of sugar coatings, other coating means have been sought to produce protective coatings, and, for this purpose non-toxic natural and artificial plastics, soluble in organic solvents have been used. The disadvantages of these coating methods are, however, that the coating substances are insoluble in water or gastric juice so that the coated objects do not disintegrate in the stomach. These coating materials are, however, somewhat soluble in the intestinal juice so that they may be used in cases when it is desired that the coated object does not dissolve in the stomach but first disintegrates when it reaches the intestine. This latter type of coating is therefore not suitable for pharmaceutical compositions designed to produce their effect as soon as possible.

Without great success, coating materials have been tried which consist of water-soluble plastics or plastics which are dissolved by the gastric juice. By the introduction of alkaline substituents into high-polymers it is, for instance, possible to obtain products which can be made to dissolve in the acidic gastric juice by salt formation. Such coatings have the disadvantage, however, of destroying alkali-sensitive substances by their alkaline reaction, since oxidation- and hydrolysis-reactions normally take place more rapidly in alkaline than in neutral surroundings.

It is also known to use as coating materials polymers of the polyvinylpyrrolidone and polyethylene glycol types which are soluble both in water and in organic solvents, but no satisfactory solution has been reached along this route since cores coated with such material easily become smeary when stored in moist surroundings or when held in the hand. Moreover, the coating is dissolved so rapidly that the taste of the core is almost immediately detected in the mouth, which is not tolerated when the core contains disagreeably tasting substances.

Hitherto, the best solution of the problem of producing a satisfactory coating, non-resistant to gastric juice, has been obtained by the use of a coating solution containing both cellulose acetate phthalate, which is insoluble in water but soluble in organic solvents, and polyethylene glycol of the type which is soluble both in water and organic solvents. It has proved, however, that such coatings must be made very thin if the coated object is to disintegrate in a satisfactory manner in water or gastric juice. If, on the other hand it is required that the coated object should be covered by the coating material to the degree desirable as regards appearance and taste, objects coated with this solution will disintegrate too slowly, because the cellulose acetate phthalate remains intact as a protective membrane around the core for a long time. Experiments performed with tablets coated in this manner show that water seems to penetrate slowly into the core but can only leave it with difficulty, and that the coating around the tablet is stretched, which seems to indicate that the coating is semi-permeable.

The object of the present invention is to provide a coating which rapidly disintegrates in water and gastric juice which is not subject to the disadvantage inherent in earlier known coatings, and which may be applied to objects to be coated in a simple manner and with a minimum of time-consuming operations.

The pharmaceutical compositions of the invention have a coating which disintegrates in aqueous media such as gastric juice, said coating comprising in inner layer 0.005–1.0 mm., preferably 0.05–0.03 mm., thick of a non-toxic-plastic substance soluble in water and organic solvents, preferably polyethylene glycol, and an outer layer of a non-toxic, water-insoluble, film-forming thermoplastic substance soluble in a volatile organic solvent. The expression "volatile" herein refers to substances or mixtures of substances having a boiling point of 50–100° C. Suitable organic solvents of this type are acetone, methyl ethyl ketone, methanol, ethanol, propanol, t-butanol, chloroform, ethyl propyl ether, dipropyl ether, di-isopropyl ether, butyl methyl ether, carbon tetrachloride, trichloroethylene, ethyl acetate, isopropyl acetate, benzene, cyclohexene and dioxane. Suitable mixtures of organic solvents are, for instance, ethyleneglycolmonomethyl ether/acetone, methanol/acetone, ethanol/acetone, dioxane/methanol and chloroform/acetone.

Compositions having a coating in accordance with the invention are satisfactorily covered as regards both taste and appearance, and at the same time the coating has a satisfactory tenacity and a suitable speed of disintegration in water and gastric juice, i.e. the coating disintegrates in from 10 seconds to 10 minutes. Another important advantage of the invention is that the application of the coating does not demand the same manual skill as older methods.

Although the course of the disintegration of the coating in water or gastric juice is not fully elucidated, it is probable that its superior properties may be ascribed to the combination of the inner, relatively thick coating of a plastic substance soluble in water and organic solvents, which has good covering ability and adheres well to the core and at the same time is rapidly dissolved by water and gastric juice, and the very thin outer layer of water-insoluble, film-forming plastic which makes the objects as durable to handling as laquered objects and effectively prevents the taste of the core being detectable in the mouth. This is the more surprising since it would have been expected that the outer water-insoluble layer would have prolonged the disintegration-time of the coated object. A possible reason why this does not happen may be that the inner water-soluble layer rapidly passes into solution so that the outer water-insoluble layer loses contact with the core. In this manner the outer film becomes extremely sensitive so that it disintegrates at once and flakes off the tablet. This explanation agrees well with the observation that when a coated tablet in accordance with the invention is placed in a beaker with water a crumpled, rapidly flaking layer is immediately formed on the surface, and at the same time, pigment mixed in the inner layer flows out into the beaker, indicating that the inner layer has dissolved.

For the formation of the inner layer a polyethylene glycol of the molecular weight 4000–40000 is preferably used, which is soluble both in water and in certain organic solvents as well as nontoxic. To the polyethylene glycol a non-toxic softener may be admixed, e.g. a polyethylene glycol of low molecular weight, i.e. of average molecular weight less than 2000, but the average molecular weight of the polyethylene glycol mixture so obtained should exceed 4000. In order that the disintegration time shall be rapid and to avoid too long a coating time, the thickness of the polyethylene glycol inner layer is 0.005 to 1.0 mm. and a thickness of 0.05–0.30 mm. has been found to be especially suitable for most forms of coating. It is a considerable advantage as compared with earlier known coating methods that it is always possible to build up a layer of the desired covering capacity and colour shade without preventing the distintegration of the coating in aqueous media by making the polyethylene glycol layer sufficiently thick.

The outer layer of a film-forming thermoplastic substance, which is non-toxic and water-insoluble but soluble in volatile organic solvents, such as methanol, ethanol, isopropanol, acetone, ether, chloroform and the like, forms a smooth, solid, coherent and non-smearing film on the composition of theinvention. Suitable such substances are cellulose acetate phthalate, cellulose acetate succinate, cellulose acetate, cellulose propionate, celluose butyrate, a polyalkylmethacrylate, polyvinyl acetate, a silicone resin, an acrylic acid/methacrylic acid copolymer, a vinyl acetate/maleic acid copolymer, or a vinyl acetate/vinylpyrrolidone copolymer, as well as natural thermoplastic substances such as shellac and zein.

The thickness of the film-forming thermoplastic layer is of critical importance and ought in ordinary circumstances to be between 0.003 and 0.050 mm. thick. If this limit is exceeded there is a risk that the short disintegration time of the coating is lost and that the outer layer becomes rough and smeary during the coating operation. If, on the other hand a thinner layer is used the consequences are not so striking but the taste of the composition penetrates too rapidly into the mouth and the protective properties of the film-forming substances are reduced.

The application of the coatings may be performed in known coating apparatus. Solutions of the substances constituting the two layers are separately poured or sprayed on the cores, which are at the same time kept in continuous movement, for instance, in a rotating pan. At each application of solution the cores should be evenly moistened, after which drying is performed by blowing on air at a suitable temperature, so that a thin layer of the plastic remains on the cores. The procedure is repeated until a coating of the desired thickness is obtained.

The coating operation with polyethylene glycol normally demands a time of about 2 hours while the application of the layer of film-forming thermoplastic substance normally demands a time of about 15 minutes. If especially thick coatings are desired, the times become somewhat longer. The concentration of the plastic solutions used ought to be chosen so that drying takes place as evenly as possible without smearing the tablets. The best concentration varies with the nature of the substances and solvents used and the mode of application. A dilute solution has of course, to be applied more often than a concentrated one. An upper limit for the concentration is set by the viscosity of the solution, since solutions which are too thick cannot be used. Usually solutions having a viscosity of 0.5–1700 centipoises are preferred. In the new coating method only highly volatile solvents are used, for which reason drying occurs very rapidly and the operations may be finished in a few hours, instead of several days as in earlier coating methods. The drying of the tablets normally takes about 2 minutes after each application. When the coating is finished the compositions may suitably be spread over a large surface for further drying overnight.

The coatings of the invention may be dyed by admixing dyestuffs into the inner relatively thick layer of polyethylene glycol. Soluble dyestuffs as well as pigments may be used and the optical covering power is improved by the addition of titanium dioxide. Suitable dyestuffs are, for instance, para-orange (Colour Index 15985) and amarant-lake (Colour Index 16185).

Objects suitable to be cooled according to the invention are tablets, pills, granules, suppositories (both rectal and vaginal) and the like.

The invention is illustrated by the following examples. In all the Examples tablets are used, weighing 550 mg. each and of the following composition:

|   | Milligram |
|---|---|
| Ascorbic acid | 220 |
| Succinic acid | 150 |
| Ferrosulphate, sicc. | 100 |
| Starch | 31 |
| Talcum | 22.5 |
| Magnesium stearate | 2.5 |
| Polyvinylpyrrolidone | 24 |

These tablets had a disintegration time according to British Pharmacopeia 1958, page 964, of 12.5 minutes.

Example 1

A solution was made of the following composition:

|   | Parts by weight |
|---|---|
| Polyethylene glycol, molecular weight 6000 | 50 |
| Chloroform | 35 |
| Acetone | 15 |

The solution so obtained was poured on to the tablets tumbling in a coating pan so that the tablets became evenly moistened on the surface. The tablets were dried by blowing on air. The procedure was repeated 20 times after which the tablets showed an even, thin coating of polyethylene glycol suitable, if desired, for engraving.

A solution of the following compositions was prepared:

|   | Parts by weight |
|---|---|
| Cellulose acetate phthalate | 6 |
| Methyl ethyl ketone | 45 |
| Acetone | 49 |

The solution obtained was poured over the rotating mass of tablets so that the tablets became evenly moistened on the surface after which the tablets were dried by blowing on air. Six applications of this kind were made, after which the coated tablets were carefully dried. They showed a glazed, hard surface which did not turn smeary on handling. The coating obtained showed the following thicknesses of the layers: inner polyethylene glycol layer 0.100 mm. and outer cellulose acetate phthalate layer 0.015 mm.

Example 2

In the same manner as in Example 1, a coating solution (containing suspended titanium dioxide) of the following composition was applied:

| | Parts by weight |
|---|---|
| Polyethylene glycol, molecular weight 6000 | 30 |
| Polyethylene glycol, molecular weight 1500 | 2 |
| Titanium dioxide | 10 |
| Acetone | 18 |
| Ethanol | 40 |

After 30 applications the tablets were wholly white and evenly covered. The finishing lacquer was made with a solution of the composition:

| | Parts by weight |
|---|---|
| Cellulose acetate phthalate | 6 |
| Glycerol triacetate | 1 |
| Acetone | 93 | which was applied 6 times. The resulting coating showed the following thicknesses of the layers: polyethylene glycol layer 0.150 mm. and cellulose acetate phthalate layer 0.015 mm.

Example 3

In the manner as in Example 1, a solution of the following composition was applied:

| | Parts by weight |
|---|---|
| Polyethylene glycol, molecular weight 4000 | 60 |
| Para-orange (Colour Index 15985) | 1 |
| Methanol | 20 |
| Acetone | 20 |

A comparatively thick coating was rapidly built up and after 130 applications the coating was evenly orange. The finishing laquer was made with a solution of the following composition:

| | Parts by weight |
|---|---|
| Polyvinylacetate, softening point 123° C. (Gelva C-5. V10) | 10 |
| Silicone plastic, 70% Wacher Chemie HK 15 A | 10 |
| Methyl ethyl ketone | 40 |
| Acetone | 40 | which was applied 10 times. The resulting coating showed the following thicknesses of layers: polyethylene glycol layer 0.8 mm. and polyvinylacetate/silicone plastic layer 0.05 mm.

Example 4

A mixture of the composition:

| | Parts by weight |
|---|---|
| Polyethylene glycol, molecular weight 6000 | 20 |
| Titanium dioxide | 5 |
| Para-orange (Colour Index 15985) | 1 |
| Methanol | 40 |
| Acetone | 34 | was carefully homogenized in a colloid-mill so that the colour became quite evenly distributed. The mixture obtained was sprayed on a rotating tablet mass until the tablets had become evenly covered. After careful drying of the tablets they were laquered with a solution containing 20 parts by weight of shellac and 80 parts by weight of ethanol which was applied only once. The resulting coating showed the following thicknesses of layers: polyethylene glycol layer 0.010 mm. and shellac layer 0.006 mm.

Example 5

In the same manner as in Example 1 a solution (containing suspended titanium dioxide) of the following composition was applied three times:

| | Parts by weight |
|---|---|
| Polyethylene glycol, molecular weight 6000 | 30 |
| Titanium dioxide | 10 |
| Amarant lake (Colour Index 16185) | 1 |
| Ethanol | 40 |
| Acetone | 19 |

The solution was homogenized in a colloid-mill. The finishing lacquer was applied by spraying with a solution containing 15 parts by weight of zein and 85 parts by weight of isopropanol so that the outer coating had a thickness of 0.010 mm. The polyethylene glycol layer had a thickness of 0.006 mm.

Example 6

In the same manner as in Example 1, a solution (containing suspended titanium dioxide) of the collowing composition was applied 30 times:

| | Parts by weight |
|---|---|
| Polyethylene glycol, molecular weight 20,000 | 5.5 |
| Polyethylene glycol, molecular weight 400 | 24.5 |
| Titanium dioxide | 10 |
| Methanol | 40 |
| Acetone | 20 | after homogenization in a colloid-mill. The tablets obtained were wholly white and evenly covered. The finishing laquer was made with a solution containing 50 parts by weight of an acrylic plastic (Eudragit L, molecular weight 135,000, 14% dry-substance) and 50 parts by weight of acetone, which was applied twice. The resulting coating showed the following thickness of layers: polyethylene glycol layer 0.15 mm. and acrylic plastic layer 0.003 mm.

The following experiments were made to compare tablets coated in accordance with the invention with tablets coated in the usual manner. In these experiments the tablet core described above, with a disintegration time of 12 minutes, was coated either with a solution of the following composition:

*Solution I (prior art)*

| | |
|---|---|
| Polyethylene glycol, molecular weight 6000 | 70.0 g. |
| Cellulose acetate phathalate, 10% solution | 300 cm.³ |
| Castor oil | 1.25 |
| Acetone | ad 500 c. cm.³ | or with a solution of the following composition:

*Solution II (in accordance with this invention)*

| | Parts by weight |
|---|---|
| Polyethylene glycol, molecular weight 6000 | 30 |
| Polyethylene glycol, molecular weight 1500 | 2 |
| Titanium dioxide | 10 |
| Acetone | 18 |
| Ethanol | 40 |

Solution I was applied to the tablets various numbers of times so as to give different thicknesses of layers. Tablets coated with solution II were lacquered in the same manner as described in Example 1 with a solution of the following composition:

| | Parts by weight |
|---|---|
| Cellulose acetate phthalate | 6 |
| Methyl ethyl ketone | 46 |
| Acetone | 49 | which was applied to three different layer thicknesses after which the disintegration time for the tablets coated in the two different ways was determined according to British Pharmacopeia 1958, page 964. The results obtained are given in the table below.

TABLE

| Tablets coated with Solution I | | Tablets coated with Solution II and then lacquered | | |
|---|---|---|---|---|
| Thickness of the polyethylene glycol coating (mm.) | Disintegration time (hours) | Thickness of polyethylene glycol coating (mm.) | Disintegration time before lacquering (min.) | Thickness of the lacquer coating (mm.) | Disintegration time (min.) |
| 0.015 | ¹ 25 | 0.04 | 12.5 | 0.004 | 13 |
| 0.030 | 1.5 | | | 0.150 | 13 |
| | | | | 0.030 | 15 |
| 0.090 | 3 | 0.15 | 12.5 | 0.004 | 13 |
| 0.150 | 3.5 | | | 0.015 | 15 |
| | | | | 0.030 | 20 |
| | | 0.25 | 12.5 | 0.004 | 13 |
| | | | | 0.015 | 13.5 |
| | | | | 0.030 | 13.5 |

¹ Min.

It is evident that the disintegration time of the tablets coated in the usual manner with a layer-thickness of 0.015–0.150 mm. is ½–3½ hours, that is 2–16 times greater than for the tablets coated in accordance with the invention. Particularly striking is that a pure cellulose acetate phthalate coating which has a thickness of 0.030 mm. gives a disintegration time of 13.5–20 minutes when it is applied on top of a polyethylene glycol layer while a coating of the same thickness, containing a mixture of 30% cellulose acetate phthalate and 70% polyethylene glycol gives a disintegration time of 1.5 hours.

The experiments also show that the disintegration time of the tablets is not prolonged by the application of the inner polyethylene glycol layer and that its thickness does not appreciably affect the disintegration time. It is also evident that the application of the outer layer of film-forming thermoplastic substance does not to any great extent prolong the disintegration time.

We claim:

1. A pharmaceutical composition consisting essentially of a core containing therapeutically effective quantities of active substance and a medicament-free coating on said core, said coating disintegrating rapidly in water and gastric juice and comprising an inner layer not more than 0.005 to 1.0 mm. thick of polyethylene glycol of molecular weight 4000–40000 and an outer layer not more than 0.003 to 0.05 mm. thick of a non-toxic, water-insoluble, film-forming thermoplastic substance soluble in a volatile organic solvent selected from the class consisting of cellulose acetate phthalate, cellulose acetate succinate, cellulose acetate, cellulose propionate, cellulose butyrate, polyalkylmethacrylates, polyvinylacetate, silicone resins, shellac, zein, acrylic/methacrylic acid copolymers, vinyl acetate/maleic acid copolymers, and vinyl acetate/vinylpyrrolidone copolymers.

2. A pharmaceutical composition consisting essentially of a core containing therapeutically effective quantities of active substance and a medicament-free coating on said core, said coating disintegrating rapidly in water and gastric juice and comprising an inner layer not more than 0.005 to 1.0 mm. thick of polyethylene glycol of molecular weight 4000–40000 admixed with polyethylene glycol of molecular weight less than 2000, the average molecular weight of the polyethylene glycol mixture being over 4000, and an outer layer not more than 0.003 to 0.05 mm. thick of a non-toxic, water-insoluble, film-forming thermoplastic substance soluble in a volatile organic solvent selected from the class consisting of cellulose acetate phthalate, cellulose acetate succinate, cellulose acetate, cellulose propionate, cellulose butyrate, polyalkylmethacrylates, polyvinylacetate, silicone resins, shellac, zein, acrylic/methacrylic acid copolymers, vinyl acetate/maleic acid copolymers, and vinyl acetate/vinylpyrrolidone copolymers.

3. A pharmaceutical composition consisting essentially of a core containing therapeutically effective quantities of active substance and a medicament-free coating on said core, said coating disintegrating rapidly in water and gastric juice and comprising an inner layer not more than 0.05 to 0.3 mm. thick of polyethylene glycol of molecular weight 400–40000 and an outer layer not more than 0.003 to 0.05 mm. thick of a non-toxic, water-insoluble, film-forming thermoplastic susbtance soluble in a volatile organic solvent selected from the class consisting of cellulose acetate phthalate, cellulose acetate succinate, cellulose acetate, cellulose propionate, cellulose butyrate, polyalkylmethacrylate, polyvinylacetate, silicone resins, shellac, zein, acrylic/methacrylic acid copolymers, vinyl acetate/maleic acid copolymers, and vinyl acetate/vinylpyrrolidone copolymers.

4. A pharmaceutical composition consisting essentially of a core containing therapeutically effective quantities of active substance and a medicament-free coating on said core, said coating disintegrating rapidly in water and gastric juice and comprising an inner layer not more than 0.05 to 0.3 mm. thick of polyethylene glycol of molecular weight 4000–40000 admixed with polyethylene glycol of molecular weight less than 2000, the average molecular weight of the polyethylene glycol mixture being over 4000, and an outer layer not more than 0.003 to 0.05 mm. thick of a film-forming thermoplastic substance selected from the class consisting of cellulose acetate phthalate, cellulose acetate succinate, cellulose acetate, cellulose propionate, cellulose butyrate, polyalkylmethacrylates, polyvinylacetate, silicone resins, shellac, zein, acrylic/methacrylic acid copolymers, vinyl acetate/maleic acid copolymers, and vinyl acetate/vinylpyrrolidone copolymers.

5. Pharmaceutical tablets, pills, granules or suppositories consisting essentially of a core containing therapeutically effective quantities of active substance and a medicament-free coating on said core, said coating disintegrating rapidly in water and gastric juice and comprising an inner layer not more than 0.005 to 1.0 mm. thick of polyethylene glycol of molecular weight 4000–40000 and an outer layer not more than 0.003 to 0.05 mm. thick of a non-toxic, water-insoluble, film-forming thermoplastic substance soluble in a volatile organic solvent selected from the class consisting of cellulose acetate phthalate, cellulose acetate succinate, cellulose acetate, cellulose propionate, cellulose butyrate, polyalkylmethacrylates, polyvinylacetate, silicone resins, shellac, zein, acrylic/methacrylic acid copolymers, vinyl acetate/maleic acid copolymers, and vinyl acetate/vinylpyrrolidone copolymers.

6. Pharmaceutical tablets, pills, granules or suppositories consisting essentially of a core containing therapeutically effective quantities of active substance and a medicament-free coating on said core, said coating disintegrating rapidly in water and gastric juice and comprising an inner layer not more than 0.05 to 0.3 mm. thick of polyethylene glycol of molecular weight 4000–40000, admixed with polyethylene glycol of molecular weight less than 2000, the average molecular weight of the polyethylene glycol mixture being over 4000, and an outer layer not more than 0.003 to 0.05 mm. thick of a film-forming thermoplastic substance selected from the class consisting of cellulose acetate phthalate, cellulose acetate succinate, cellulose acetate, cellulose propionate, cellulose butyrate, polyalkylmethacrylates, polyvinylacetate, silicone resins, shellac, zein, acrylic/methacrylic acid copolymers, vinyl acetate maleic acid copolymers, and vinyl acetate/vinylpyrrolidone copolymers.

7. A composition claimed in claim 1, wherein the active substance is moisture sensitive.

8. A composition claimed in claim 3, wherein the active substance is moisture sensitive.

9. A composition claimed in claim 5, wherein the active substance is moisture sensitive.

10. A composition claimed in claim 1, wherein the core is capable of disintegrating relatively rapidly in gastric juice.

11. A composition claimed in claim 3, wherein the core is capable of disintegrating relatively rapidly in gastric juice.

12. A composition claimed in claim 5, wherein the core is capable of disintegrating relatively rapidly in gastric juice.

References Cited

UNITED STATES PATENTS

| | | | |
|---|---|---|---|
| 2,738,303 | 3/1956 | Blythe | 167—82.5 |
| 2,949,402 | 8/1960 | Mehrabi-Nejad et al. | 167—82 |
| 3,039,933 | 6/1962 | Goldman | 167—82 |
| 2,702,264 | 2/1955 | Klaui | 167—82 |
| 2,887,438 | 5/1959 | Cooper et al. | 167—82 |
| 2,928,770 | 3/1960 | Bardani | 167—82 |
| 2,991,226 | 7/1961 | Millar et al. | 167—82 |
| 3,089,824 | 5/1963 | Wurster | 167—82 |
| 3,096,248 | 7/1963 | Rudzki | 167—82 |
| 3,115,441 | 12/1963 | Hermelin | 167—82 |

FOREIGN PATENTS

| | | |
|---|---|---|
| 762,229 | 11/1956 | Great Britain. |
| 764,342 | 12/1956 | Great Britain. |
| 561,936 | 8/1958 | Canada. |

OTHER REFERENCES

Gans et al., "The Use of Polyethylene Glycol in Tablet Coating," J. A. Ph. A. Sci., ed. 43 (8): 483–485, August 1954.

LEWIS GOTTS, *Primary Examiner.*

JULIAN S. LEVITT, *Examiner.*

G. A. MENTIS, S. K. ROSE, *Assistant Examiners.*